United States Patent [19]

Heiss

[11] 4,297,472

[45] Oct. 27, 1981

[54] METHOD OF PRODUCING COLOR STABLE THERMOPLASTIC POLYMETHANES AND PRODUCTS MADE THEREBY

[75] Inventor: Herbert L. Heiss, New Martinsville, W. Va.

[73] Assignee: Mobay Chemical Corporation, Pittsburgh, Pa.

[21] Appl. No.: 828,121

[22] Filed: Aug. 26, 1977

[51] Int. Cl.$^3$ .................... C08G 18/32; C08G 18/42
[52] U.S. Cl. ........................ 528/84; 528/48; 260/45.95 L
[58] Field of Search .................. 260/75 NP, 77.5 SS, 260/45.95 L; 528/48, 84

[56] References Cited

U.S. PATENT DOCUMENTS

| | | | |
|---|---|---|---|
| 2,753,319 | 7/1956 | Brockway | 260/75 NP |
| 3,214,411 | 10/1965 | Saunders et al. | 260/75 NP |
| 3,296,212 | 1/1967 | Britain | 260/75 NP |
| 3,493,634 | 2/1970 | Kolycheck | 260/75 NP |
| 3,888,908 | 6/1975 | Cross et al. | 260/75 NP |
| 3,931,113 | 1/1976 | Seeger et al. | 260/75 NP |

*Primary Examiner*—H. S. Cockeram
*Attorney, Agent, or Firm*—Gene Harsh; Joseph C. Gil

[57] ABSTRACT

The instant invention is directed to a novel method for improving the color stability of thermoplastic polyurethanes and the polyurethanes produced thereby. The invention broadly consists of adding relatively small amounts of a specified hydroxyl group containing additive to the thermoplastic polyurethane reaction mixture. The additive may be added before, or during production of the thermoplastic polyurethane. In general the additive is defined as:

(a) having a molecular weight of 400 or less, and
(b) containing from 2 to 4 aliphatic hydroxyl groups, with at least 2 of the hydroxyl groups being vicinal, and with the vicinal hydroxyl groups being primary and/or secondary.

6 Claims, No Drawings

METHOD OF PRODUCING COLOR STABLE THERMOPLASTIC POLYMETHANES AND PRODUCTS MADE THEREBY

BACKGROUND OF THE INVENTION

Since thermoplastic polyurethanes based on polyesters and aromatic polyisocyanates will ultimately discolor, only mild interest has been displayed in the past in providing products with low initial color.

Recently, there has developed a market for colorless, transparent roller skate wheels molded from thermoplastic polyurethanes. The specific type of discoloration of interest was that which occurred during exposure of the thermoplastic polyurethane to processing temperatures experienced during drying, extrusion, or molding. The yellowing of the polymer did not seem to be associated with any significant change in strength properties and was entirely different from the discoloration which occurs during the service life of the ultimate molded or final product (i.e., weathering). It was found that this discoloration could occur during pelletization extrusion resulting in the shipment of pellets to the molder which varied in color. In fact, it was found that some lots of thermoplastic polyurethane discolored even more during the maufacturer's drying and/or molding operations with the result that the ultimate product also varied in color.

Finally, although many thermoplastic polyurethanes exhibit this tendency to discolor to varying degrees, the problem is most pronounced in those polyurethanes prepared from aromatic isocyanates and polyesters wherein the only diol used is 1,4-butanediol.

DESCRIPTION OF THE INVENTION

It has now been found that the discoloration problems noted above can be substantially eliminated by adding to the thermoplastic polyurethane reaction mixture, from 0.05 to 2 percent by weight, based on the total weight of the thermoplastic polyurethane, of a hydroxyl group containing additive, said additive characterized as
  (a) having a molecular weight of 400 or less, and
  (b) containing from 2 to 4 aliphatic hydroxyl groups, with at least 2 of the hydroxyl groups being vicinal and with the vicinal hydroxyl groups being primary and/or secondary.

The use of the hydroxyl group containing additive described herein can be used in essentially any thermoplastic polyurethane formulation but is beneficial only in those cases where the hydroxyl group containing additive is not already present as a chain extender or as an impurity in the polyester. Thus, the instant invention is limited to those polyurethane formulations which do not already contain the additive, since it has been found that the presence of the additive in either the polyester (e.g., poly(ethylene) adipate) or the chain extender would be sufficient to prevent the discoloration problem noted above.

Thus, the instant invention is directed to a process of producing a thermoplastic polyurethane wherein the above-noted additive in small amounts is added to a polyurethane reaction mixture before or during the reaction to produce the urethane. The polyurethane reaction mixture generally comprises an aromatic polyisocyanate, a polyester polyol and a chain extender. The additive may be added to the polyol or to the chain extender. Additionally, the additive can be added as a separate component.

As noted above, the additive is added in an amount ranging from 0.05 to 2 percent, preferably 0.1 to 1.0 percent, and most preferably 0.2 to 0.7 percent, by weight based on the total weight of the thermoplastic polyurethane reaction mixture. It thus can be seen that the amounts used are substantially less than the amounts of such material which are commonly used in the art when such additives are used as a chain-extender or co-chain-extender.

Thus, the instant invention may be characterized as a method of improving the color stability of thermoplastic polyurethanes prepared from a reaction mixture comprising:
  (a) an aromatic polyisocyanate,
  (b) a polyester polyol, and
  (c) an active hydrogen containing chain extender,
said method comprising adding to said reaction mixture
  (d) from 0.05 to 2 percent by weight based on the total weight of the reaction mixture of a hydroxyl group containing additive, said additive characterized as
    (i) having a molecular weight of 400 or less, and
    (ii) containing 2 to 4 aliphatic hydroxyl groups, with at least 2 of said hydroxyl groups being vicinal, and with the vicinal hydroxyl groups being primary and/or secondary; and
reacting components (a), (b), (c) and (d) to form said thermoplastic polyurethane. It is presently preferred that the additive contain only 2 hydroxyl groups and that both be primary.

Suitable additives within the above definition are known and include ethylene glycol (which is presently preferred), 1,2-propanediol, 1,2-butanediol, 2,3-butanediol, 1,2-cyclohexanediol, glycerine, glyceryl mono esters, glyceryl mono ethers, the applicable hexane diols, and the like. In actual practice, the specific selection will be dependent upon such factors as compatibility with the reaction mixture being used, price, availability, effect on product transparency and the like. It is presently felt that ethylene glycol is the preferred additive in most instances. Due to its low molecular weight and the primary hydroxyl groups, it is most effective at lowest concentration.

In practicing the process in accordance with this invention, the additive can be dissolved in the polyester, the extender or mixtures thereof or it may be added as a separate stream to the reaction mixture. The particular method of addition is not critical other than the fact that it must be present during the polymerization reaction.

In the preparation of polyesterurethanes, any suitable polyester may be used, such as those prepared from polycarboxylic acids and polyhydric alcohols. Any suitable polycarboxylic acid may be used such as, for example, benzene, tricarboxylic acid, adipic acid, succinic acid, suberic acid, sebacic acid, oxalic acid, methyladipic acid, glutaric acid, pimelic acid, azelaic acid, phthalic acid, terephthalic acid, isophthalic acid, thiodipropionic acid, maleic acid, fumaric acid, citraconic acid, itaconic acid and the like. Any suitable polyhydric alcohol may be used such as, for example, propylene glycol, 1,4-butanediol, 1,3-butanediol, 1,5-pentanediol, 1,6-hexanediol, bis-(hydroxy methyl chlorohexane), diethylene glycol, 2,2-dimethyl propylene glycol, 1,3,6-hexanetriol, trimethylol propane, pentacrythritol, sorbitol, glycerine and the like. Also, suitable as polyesters in the preparation of polyesterurethanes are those prepared from lactams, lactones, polyesteramides, and the like.

In the preparation of polyesteramides, an amine is included in the reaction of a carboxylic acid and an alcohol, aminoalcohol or aminoacid can be used. Any suitable amino compound can be used to prepare polyesteramides such as, for example, hexamethylene diamine, ethylene diamine, propylene diamine, butylene diamine, cyclohexyl diamine, phenylene diamine, tolylene diamine, xylylene diamine, 4,4'-diaminodiphenylmethane, naphthylene diamine, aminoethyl alcohol, aminopropyl alcohol, aminobutyl alcohol, aminobenzyl alcohol, aminoacetic acid, aminopropionic acid, aminobutyric acid, aminovaleric acid, aminophthalic acid, aminobenzoic acid and the like. Of course, the amino compounds may be reacted either simultaneously with the ester forming components of sequentially therewith.

Any suitable aromatic polyisocyanate can be used in the preparation of polyesterurethanes by reaction with a polyester such as 1,4-phenylene diisocyanate, 1,3-phenylene diisocyanate, 2,4-tolylene diisocyanate, 2,5-tolylene diisocyanate, 2,6-tolylene diisocyanate, 3,5-tolylene diisocyanate, 4-chloro-1,3-phenylene diisocyanate, 1-methoxy-2,4-phenylene diisocyanate, 1-methyl-3,5-diethyl-2,6-phenylene diisocyanate, 1,3,5-tri-ethyl-2,4-phenylene diisocyanate, 1-methyl-3,5-diethyl-2,4-phenylene diisocyanate, 1-, ethyl-3,5-diethyl-6-chloro-2,4-phenylene diisocyanate, 6-methyl-2,4-diethyl-5-nitro-1,3-phenylene diisocyanate, p-xylylene diisocyanate, m-xylylene diisocyanate, 4,6-dimethyl-1,3-xylylene diisocyanate, 1,3-dimethyl-4,6-bis(beta-isocyanatoethyl)-benzene, 3-(alpha-isocyanatoethyl)phenylisocyanate, 4,4'-biphenylene diisocyanate, 3,3'-dimethyl-4,4'-biphenylene diisocyanate, 3,3'-dimethoxy-4,4'-biphenylene diisocyanate, 3,3'-diethoxy-4,4'-biphenylene diisocyanate, 1,1'bis-(4-isocyanatophenyl)cyclohexane, 4,4'- and 2,4'-diisocyanato-diphenylmethane, 4,4'-diisocyanato-3,3'-dimethyldiphenylmethane, 4,4'-diisocyanato-3,3'-dichlorodiphenylmethane, 4,4'-diisocyanato-diphenyldimethylmethane, 1,5-naphthylene diisocyanate, 1,4-naphthylene diisocyanate, 2,4,4'-triisocyanato-diphenylether, 2,4,6-triisocyanato-1-methyl-3,5-diethylbenzene, and the like.

The invention is particularly applicable to the stabilization of polyesterurethanes used in the manufacture of elastomers or casting resins for molded elements.

In the preparation of polyesterurethanes in accordance with this invention, any of the above-mentioned polyesters may be reacted with any of the isocyanates set forth and a chain extending agent containing active hydrogen atoms which are reactive with NCO groups and having a molecular weight less than about 500 such as, for example, water, 1,3-propylene glycol, 1,3-butylene glycol, 1,4-butanediol, butenediol, butynediol, xylyene glycol, amylene glycol, neopentyl glycol, 1,4-phenylene-bis-(b-hydroxy ethyl ether), 1,3-phenylene-bis-(b-hydroxy ethyl ether), bis-(hydroxy methyl-cyclohexane), 1,6 hexanediol, diethylene glycol, dipropylene glycol and the like; polyamines such as for example, ethylene diamine, propylene diamine, butylene diamine, hexamethylene diamine, cyclohexylene diamine, phenylene diamine, tolylene diamine, xylylene diamine, 3,3'-dichlorobenzidene, 3,3'-dinitrobenzidene, 4,4'-methylene-bis(2-chloraniline), 3,3-dichloro-4,4'-biphenyl diamine, 2,6-diamino pyridine, 4,4'-diamino diphenyl methane, and the like; hydrazine, substituted hydrazines such as, for example, N,N'-dimethyl hydrazine, 1,6-hexamethylene-bis-hydrazine, carbodihydrazide, hydrazides of dicarboxylic acids and disulfonic acids such as adipic acid dihydrazide, oxalic acid dihydrazide, isophthalic acid dihydrazine, thiodipropionic acid dihydrazide, tartaric acid dihydrazide, 1,3-phenylene-disulfonic acid dihydrazide, omega-amino-capronic acid, dihydrazide, gamma-hydroxy butyric hydrazide, bis-semi-carbazide, bis-hydrazine carbonic esters of glycols such as many of the glycols heretofore mentioned and the like.

The following Examples illustrate the present invention.

Unless otherwise specified, all figures are to be understood as parts or percentages by weight.

EXAMPLES 1 THROUGH 12

About 1000 parts of a polyester polyol (prepared from 1,4-butanediol and adipic acid with a molecular weight of about 2000 and an hydroxyl number of 56) was reacted with about 100 parts of 1,4-butane diol and 410 parts of methylene bis(phenylisocyanate) by mixing the ingredients and curing in an oven for 30 minutes at 110° C. The resultant material was granulated and molded into test slabs in an injection molding machine.

The resulting slabs were then exposed in a circulating air oven at 110° C. for 16 hours and compared for color development of the Yellow Index test (ASTM-D-1925-63T).

The above formulation describes the control (no additives) and was selected because of its pronounced tendency to yellow. In the examples, where the additive was added to the reaction mixture, an equivalent increase in the amount of isocyanate was required.

The amounts and types of additives tested were as set forth in the TABLE. The contents were as set forth in the TABLE.

Examples 7 and 12 represent comparative tests wherein hydroxyl additives outside the scope of the invention were used.

TABLE

| Example Number | Additive | Parts Additive Per 100 Parts by Weight of Total Reaction Mixture | Yellow Index |
|---|---|---|---|
| 1 | None | — | 37.7 |
| 2 | Ethylene Glycol | 0.2 | 17.6 |
| 3 | Ethylene Glycol | 1.0 | 10.8 |
| 4 | 1,2-Propane Diol | 0.24 | 15.5 |
| 5 | 1,2-Butane Diol | 0.29 | 13.4 |
| 6 | 2,3-Butane Diol | 0.29 | 17.6 |
| 7 | Pinacol | 0.38 | 31.8 |
| 8 | 1,2-Cyclohexane Diol | 0.37 | 22.3 |
| 9 | Glycerine | 0.30 | 17.6 |
| 10 | Glyceryl Monooleic Ester | 1.10 | 19.6 |
| 11 | Glyceryl Monoallyl Ether | 0.42 | 18.9 |
| 12 | Pyrocatechol | 0.35 | >>40 |

What is claimed is:

1. A method of improving the color stability of thermoplastic polyurethanes prepared from a reaction mixture comprising
   (a) an aromatic polyisocyanate,
   (b) a polyester polyol, and
   (c) an active hydrogen containing chain extender, said method comprising
   (A) adding to said reaction mixture (d) from 0.05 to 2 percent by weight based on the total weight of said reaction mixture of a hydroxyl group containing additive, said additive characterized as
  (i) having a molecular weight of 400 or less, and
  (ii) containing 2 to 4 aliphatic hydroxyl groups with at least 2 of said hydroxyl groups being vicinal and with the vicinal hydroxyl groups being primary and/or secondary, said additive (d) not being present in component (b) or (c), and
(B) reacting said components (a), (b), (c) and (d).

2. The method of claim 1 wherein said additive is used in amounts ranging from 0.1 to 1 percent by weight.

3. The method of claim 2 wherein said additive is used in amounts ranging from 0.2 to 0.7 percent by weight.

4. The method of claim 1, wherein said additives contains 2 vicinal hydroxyl groups, both of which are primary hydroxyl groups.

5. The method of claim 4, wherein said additive is ethylene glycol.

6. The thermoplastic polyurethane produced according to the process of claim 1.

* * * * *